US011528858B2

(12) United States Patent
Lee et al.

(10) Patent No.: US 11,528,858 B2
(45) Date of Patent: Dec. 20, 2022

(54) PLANT CULTIVATING APPARATUS (71) Applicant: LG Electronics Inc., Seoul (KR)

(72) Inventors: Dongjin Lee, Seoul (KR); Youngsuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 126 days.

(21) Appl. No.: 16/685,801

(22) Filed: Nov. 15, 2019

(65) Prior Publication Data

US 2020/0154657 A1 May 21, 2020

(30) Foreign Application Priority Data

Nov. 15, 2018 (KR) .................. 10-2018-0140898

(51) Int. Cl.
*A01G 31/02* (2006.01)
*A01G 31/06* (2006.01)
*G05D 9/12* (2006.01)

(52) U.S. Cl.
CPC ............. *A01G 31/02* (2013.01); *A01G 31/06* (2013.01); *G05D 9/12* (2013.01)

(58) Field of Classification Search
CPC .......... A01G 31/02; A01G 31/06; A01G 9/14; A01G 9/16
See application file for complete search history.

(56) References Cited

U.S. PATENT DOCUMENTS 5,136,804 A * 8/1992 Rothem ................. A01G 31/02
47/60
5,937,575 A * 8/1999 Zobel ..................... A01G 31/02
47/62 A
6,061,957 A * 5/2000 Takashima ............. A01G 22/15
47/66.1

(Continued)

FOREIGN PATENT DOCUMENTS

CN     103975839 A     8/2014
JP     2003310069 A    11/2003

(Continued)

OTHER PUBLICATIONS

Extended European Search Report in European Appln. No. 19209478.7, dated Apr. 1, 2020, 9 pages.

*Primary Examiner* — Joshua D Huson
*Assistant Examiner* — Megan J Moroney
(74) *Attorney, Agent, or Firm* — Fish & Richardson P.C.

(57) ABSTRACT

A plant cultivating apparatus includes a body that defines a cultivation chamber, a cultivation bed disposed on the cultivation chamber and configured to move relative to the body, a nutrient storage configured to store nutrient solution, a pipe configured to supply the nutrient solution to the cultivation bed, a bed checker configured to detect movement of the cultivation bed, a level checker configured to detect a level of nutrient solution in the cultivation bed, and a controller configured to receive a signal from the bed checker and the level checker and to adjust the nutrient (Continued)

solution supplied to the cultivation bed. The cultivation bed includes a signal connector that is disposed on one surface of the cultivation bed corresponding to the bed checker and the level checker and that is selectively connected to the bed checker and the level checker according to whether to move the cultivation bed.

17 Claims, 3 Drawing Sheets

(56) References Cited

U.S. PATENT DOCUMENTS

| | | | | |
|---|---|---|---|---|
| 8,910,419 | B1* | 12/2014 | Oberst | A01G 31/06 47/60 |
| 9,718,605 | B2* | 8/2017 | Snelten | B65D 85/52 |
| 9,888,635 | B2* | 2/2018 | Wu | A01G 31/06 |
| 2014/0115958 | A1* | 5/2014 | Helene | A01G 31/06 47/17 |
| 2017/0094920 | A1* | 4/2017 | Ellins | A01G 31/02 |
| 2018/0317410 | A1* | 11/2018 | Spiro | A01G 9/126 |
| 2019/0075741 | A1* | 3/2019 | Olesen | A01G 31/06 |
| 2019/0082627 | A1* | 3/2019 | Moffitt | B65D 88/74 |
| 2019/0141923 | A1* | 5/2019 | Ray, Jr. | F21V 29/503 47/62 R |
| 2019/0208711 | A1* | 7/2019 | Sahu | A01G 9/249 |
| 2019/0223395 | A1* | 7/2019 | Warrick | A01G 31/06 |

FOREIGN PATENT DOCUMENTS

| | | |
|---|---|---|
| KR | 20120112986 | 10/2012 |
| KR | 10-1240375 | 3/2013 |
| KR | 20180035471 | 4/2018 |

* cited by examiner

PLANT CULTIVATING APPARATUS

CROSS-REFERENCE TO RELATED APPLICATIONS

The present application claims the benefits of priority to Korean Patent Application No. 10-2018-0140898, filed on Nov. 15, 2018, which is herein incorporated by reference in its entirety.

BACKGROUND

The present disclosure relates to a plant cultivating apparatus.

The general plant cultivating apparatus forms a preset cultivation chamber having an environment suitable for plant growth, and stores plant in the preset cultivation chamber. The plant cultivating apparatus is provided with a configuration for supplying nutrients and light energy necessary for plant growth, and the plant is grown by the nutrients and light energy supplied. For example, in Korean Patent No. 10-1240375, a technology related to "Plant Cultivating apparatus" is disclosed.

According to the prior art, the nutrient solution supplied to the cultivation bed flows out to a recovery pipe having a constant height, and a constant water level is maintained by the recovery pipe. However, there is a problem that the nutrient solution overflows from the cultivation bed if the supply amount of the nutrient solution is larger than the outflow amount flowing into the recovery pipe. In addition, there is a problem that the light energy supplied to the plant is reduced if the cultivation bed movably provided in the plant cultivating apparatus is disposed in the wrong position. In addition, there is a problem that the nutrient solution is not properly supplied to the cultivation bed if the cultivation bed movably provided in the plant cultivating apparatus is disposed in the wrong position.

SUMMARY

An object of the present disclosure is to provide a plant cultivating apparatus that can easily grasp the level of the nutrient solution supplied to the cultivation bed.

An object of the present disclosure is to provide a plant cultivating apparatus that can easily grasp whether a cultivation bed movably provided is disposed at an exact position.

The plant cultivating apparatus according to the present disclosure may include a bed check unit for detecting the movement of the cultivation bed movably provided relative to the body, and the bed check unit can detect the movement of the cultivation bed according to whether the cultivation bed is moved relative to the body.

The plant cultivating apparatus according to the present disclosure includes a level check unit for detecting the level of nutrient solution stored in the cultivation bed and can adjust whether the nutrient solution is supplied to the cultivation bed according to the level of the nutrient solution stored in the cultivation bed.

The plant cultivating apparatus according to the present disclosure may adjust whether the nutrient solution is supplied to the cultivation bed by adjusting whether to detect the level of the nutrient solution stored in the cultivation bed according to whether to the movement of the cultivation bed detected by the bed check unit.

According to the present disclosure, whether the supply of nutrient solution supplied to the cultivation bed is adjusted according to whether to the movement of the cultivation bed, thereby preventing a leak that may occur if the nutrient solution is supplied to the cultivation bed.

According to the present disclosure, light energy can be uniformly supplied to plants sown in the cultivation bed in order to detect whether to detect movement of the cultivation bed.

According to the present disclosure, since the signal for detecting the level of the nutrient solution is immediately changed according to the level of the nutrient solution supplied to the cultivation bed, it is possible to adjust whether to supply the nutrient solution by quickly and accurately grasping the level.

According to the present disclosure, by simplifying the configuration for detecting the movement of the cultivation bed and the configuration for detecting the level of nutrient solution stored in the cultivation bed, it is possible to reduce the manufacturing cost of the plant cultivating apparatus.

DETAILED DESCRIPTION OF THE EMBODIMENTS

Hereinafter, some embodiments of the present disclosure will be described in detail with reference to the accompanying drawings. In adding reference numerals to the components of each drawing, it should be noted that the same reference numerals are assigned to the same components as much as possible even though they are illustrated in different drawings. In addition, in describing the embodiments of the present disclosure, if it is determined that a detailed description of a related well-known configuration or function interferes with the understanding of the embodiments of the present disclosure, the detailed description thereof will be omitted.

In addition, in describing the components of the embodiments of the present disclosure, terms such as first, second, A, B, (a), and (b) may be used. These terms are only for distinguishing the components from other components, and the nature, sequence, or order of the components are not limited by the terms. If a component is described as being "connected", "coupled" or "accessed" to another component, that component may be directly connected or accessed to that other component, but It is to be understood that another component may be "connected", "coupled" or "accessed" between each component.

Figure 1:
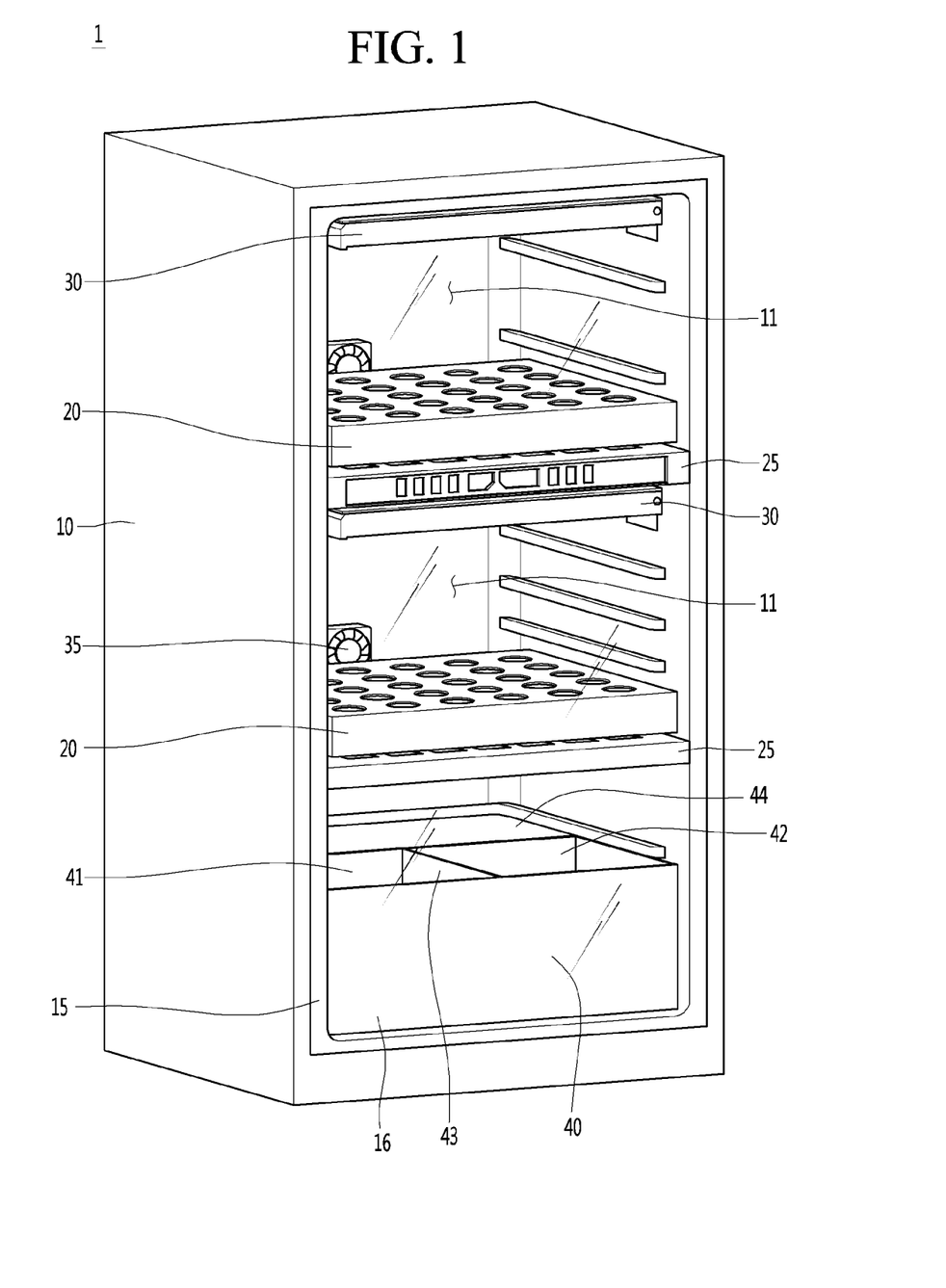
FIG. 1 is a perspective view illustrating a plant cultivating apparatus according to the present disclosure.

FIG. 1 is a perspective view illustrating a plant cultivating apparatus according to the present disclosure.

Referring to FIG. 1, the plant cultivating apparatus 1 according to the present disclosure may include a body 10.

The body 10 may be formed so that one side thereof is opened. An inner space may be formed in the body 10. The door 15 may be disposed at an opened side of the body 10. The door 15 may selectively shield one opened side of the body 10. The door 15 and the body 10 may be connected by a hinge. The door 15 may be provided with a front glass 16. The inner space of the body 10 may be exposed to the outside by the front glass 16.

The plant cultivating apparatus 1 may include a cultivation bed 20. The cultivation bed 20 may be disposed in an inner space of the body 10. Plants may grow in the cultivation bed 20. The cultivation bed 20 may support the growing plant and supply nutrients to the plant. The cultivation bed 20 may be configured to store the nutrient solution containing the nutrients required for the growth of the plant. For example, the cultivation bed 20 may include a bed body formed in a polygon in which one surface is opened. A storage space for storing nutrient solution may be formed in the bed body. The storage space may be defined by the inner surface of the bed body. The cultivation bed 20 may further include a bed cover which covers an opened surface of the bed body. The bed cover may be detachably mounted to the bed body. The bed cover may be provided with a plurality of holes in which a plurality of plants can be disposed.

A plurality of cultivation beds 20 may be provided. The plurality of cultivation beds 20 may be disposed so as to be spaced apart from each other in the vertical direction in the body 10. A bed pedestal 25 for supporting the cultivation bed 20 may be provided in the body 10. The bed pedestal 25 may be configured to be movable relative to the body 10. In addition, the bed pedestal 25 may be fixed to the body 10. If the bed pedestal 25 is configured to be movable relative to the body 10, the cultivation bed 20 may be moved by the bed pedestal 25. If the bed pedestal 25 is fixed to the body 10, the cultivation bed 20 may slide in the bed pedestal 25.

The plant cultivating apparatus 1 may include a light source module 30. The light source module 30 may be disposed in the body 10. The light source module 30 may be disposed above the cultivation bed 20. The light source module 30 may supply light energy to a plant growing in the cultivation bed 20. The light source module 30 may include a light source for generating light, a power supply unit supplying power to the light source, a reflecting plate reflecting light, and the like. The light source module 30 may further include a cooling unit for cooling the light source. The cooling unit may cool the heat generated by the light source to improve the life of the light source.

A cultivation chamber 11 may be defined between the cultivation bed 20 and the light source module 30. The cultivation chamber 11 can be understood as a space in which plants sown in the cultivation bed 20 can grow.

One side of the cultivation chamber 11 may be provided with a ventilation unit 35. The ventilation unit 35 may be provided in the body 10. The ventilation unit 35 may supply outside air to the inside of the cultivation chamber 11. The ventilation unit 35 may be provided as a blowing fan. The ventilation unit 35 may selectively communicate the cultivation chamber 11 and external space with each other. The ventilation unit 35 may supply outside air into the cultivation chamber 11 to control moisture, carbon dioxide concentration, and the like in the cultivation chamber 11.

The plant cultivating apparatus 1 may include a nutrient solution storage unit 40. The nutrient solution storage unit 40 may be disposed in the body 10. The nutrient solution may be stored in the nutrient solution storage unit 40. The nutrient solution storage unit 40 may be disposed below the body 10. In the present embodiment, the nutrient solution storage unit 40 may include a hot water tank 41, a cold water tank 42, and a separation plate 43. The warm nutrient solution may be stored in the hot water tank 41, and the cold nutrient solution may be stored in the cold water tank 42. The hot water tank 41 and the cold water tank 42 may be divided by the separation plate 43. Nutrient solution stored in each of the hot water tank 41 and the cold water tank 42 may be supplied to the cultivation bed 20. The nutrient solutions of different temperatures from each other stored in the hot water tank 41 and the cold water tank 42 may be mixed and supplied to the cultivation bed 20. For example, the temperature of the nutrient solution present in the cultivation bed 20 may be measured, and a nutrient solution of a preset temperature based on the measured temperature may be supplied.

The plant cultivating apparatus 1 may include a nutrient solution pump 44. The nutrient solution pump 44 may be disposed at one side of the nutrient solution storage unit 40. The nutrient solution stored in the nutrient solution storage unit 40 may be supplied to the cultivation bed 20 by the nutrient solution pump 44. The nutrient solution pump 44 and the nutrient solution storage unit 40 may be connected by a pipe 45. The nutrient solution pump 44 and the cultivation bed 20 may be connected by a pipe 45. In other words, the nutrient solution stored in the nutrient storage unit 40 may be supplied to the cultivation bed 20 through the pipe 45. At this time, the pipe for supplying the nutrient solution from the nutrient solution storage unit 40 to the cultivation bed 20 may be referred to as a supply pipe. For example, the pipe 45 can be disposed above the cultivation bed 20 to prevent from being in contact with the cultivation bed 20 if the cultivation bed 20 moves in the front and rear direction. The pipe 45 may further include a valve. The valve may be controlled by the control unit 100 to be described later.

Meanwhile, the cultivation bed 20 and the nutrient solution storage unit 40 are connected by a pipe 45, and thus the nutrient solution stored in the cultivation bed 20 may be recovered to the nutrient solution storage unit 40. In this case, the pipe 45 connecting the cultivation bed 20 and the nutrient solution storage unit 40 may be referred to as a recovery pipe.

Figure 2:
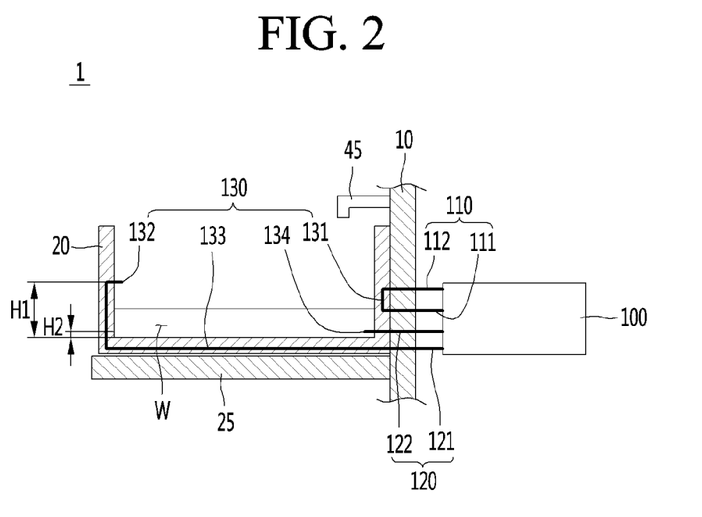
FIG. 2 is a view illustrating a state where the cultivation bed of the plant cultivating apparatus according to the invention is drawn into.
Figure 3:
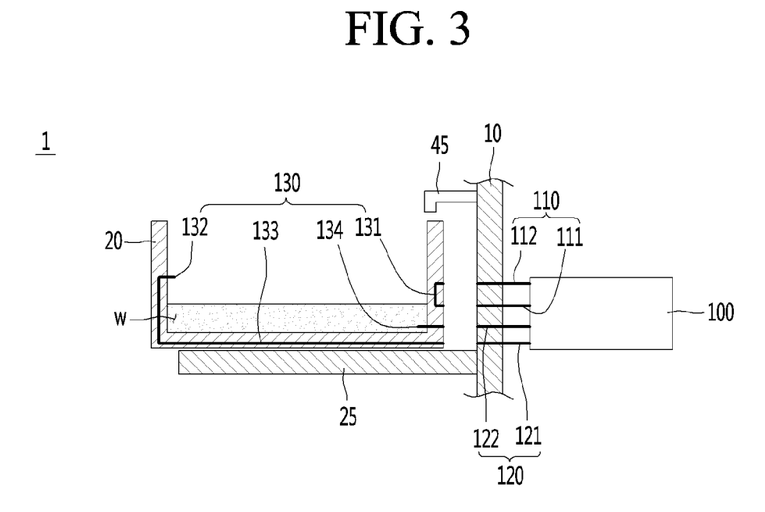
FIG. 3 is a view illustrating a state where the cultivation bed of the plant cultivating apparatus according to the present disclosure is drawn out.

FIG. 2 is a view illustrating a state where the cultivation bed of the plant cultivating apparatus according to the invention is drawn into, and FIG. 3 is a view illustrating a state where the cultivation bed of the plant cultivating apparatus according to the present disclosure is drawn out.

Referring to FIGS. 2 and 3, the plant cultivating apparatus 1 according to the present disclosure may include a control unit 100. The control unit 100 may control the operation of the plant cultivating apparatus 1. For example, the control unit 100 may control the operation of the ventilation unit 35 to improve the environment of the cultivation chamber 11. In addition, the control unit 100 may control the operation of the light source module 30 to adjust the amount of light irradiated to the plant growing in the cultivation chamber 11 or may turn on/off the light source. In addition, the control unit 100 may control the operation of the nutrient solution pump 44 to adjust the supply amount of nutrient solution supplied to the cultivation bed 20. In addition, the control unit 100 may include a configuration for informing the user of the operating state of the plant cultivating apparatus 1.

In the present embodiment, the control unit 100 may determine whether the cultivation bed 20 is drawn into and out, and adjust whether the nutrient solution supplied to the cultivation bed 20 is supplied. In addition, in the present embodiment, the control unit 100 may adjust the supply amount of the nutrient solution supplied to the cultivation bed 20.

The control unit 100 may include a bed check unit 110. The bed check unit 110 may grasp whether the cultivation bed 20 is mounted on the body 10 of the plant cultivating apparatus 1. The cultivation bed 20 may move with respect to the body 10 in the rear and front direction. At this time, if the cultivation bed 20 is moved to the front, the cultivation bed 20 may be drawn out to the outer space. If the cultivation bed 20 is moved to the rear, the cultivation bed 20 may be drawn into the inner space of the body 10. In other words, the bed check unit 110 may grasp whether the cultivation bed 20 is drawn into the inner space of the body 10. In the present embodiment, the bed check unit 110 can grasp whether a portion of the cultivation bed 20 is in contact with one surface of the body 10 in a state where the cultivation bed 20 is seated on the bed pedestal 25. At this time, one surface of the body 10 can be understood as an inner surface of the body 10 forming the cultivation chamber 11.

The bed check unit 110 may include a first signal output unit 111 and a first signal input unit 112. The bed check unit 110 may be provided in the body 10 of the plant cultivating apparatus 1. The first signal output unit 111 and the first signal input unit 112 may be connected to the control unit 100. For example, the first signal output unit 111 and the first signal input unit 112 may be provided to transmit electrical signals by terminals, conductors, cables, electric wires, or the like. One end of the first signal output unit 111 and one end of the first signal input unit 112 may be connected to the control unit 100. The other end of the first signal output unit 111 and the other end of the first signal input unit 112 may be exposed to the inner surface of the body 10. An extension portion connecting one end and the other end of the first signal output unit 111 and an extension portion connecting one end and the other end of the first signal input unit 112 may be disposed in the body 10. The first signal output unit 111 and the first signal input unit 112 may be spaced apart from each other.

The first signal output unit 111 may be defined as a transmission end for receiving an electrical signal from the control unit 100 and transmitting the electrical signal to the first signal input unit 112 or a signal output end for outputting an electrical signal. The first signal input unit 112 may be defined as a reception end for receiving an electrical signal from the first signal output unit 111 and transmitting the electrical signal to the control unit 100 or a signal input end for receiving an electrical signal. The control unit 100, the first signal output unit 111, and the first signal input unit 112 may be connected to each other by a first signal connection unit 131, which will be described later, to form a closed curve for transmitting an electrical signal. An electrical signal transmitted from the first signal output unit 111 and the first signal input unit 112 may be defined as a first signal. The first signal may include information that the cultivation bed 20 is drawn out or into.

The control unit 100 may include a level check unit 120. The level check unit 120 may determine the level of the nutrient solution stored in the cultivation bed 20. The level check unit 120 may grasp the level of the nutrient solution stored in the cultivation bed 20 in a state where the cultivation bed 20 is seated on the bed pedestal 25. The level check unit 120 may operate in conjunction with the bed check unit 110. The level check unit 120 may recognize whether the cultivation bed 20 is mounted from the bed check unit 110 and grasp the level of the nutrient solution stored in the cultivation bed 20. The level check unit 120 may measure the level of the nutrient solution stored in the cultivation bed 20 while the cultivation bed 20 is mounted on the bed pedestal 25.

The level check unit 120 may include a second signal output unit 121 and a second signal input unit 122. The level check unit 120 may be provided in the body 10 of the plant cultivating apparatus 1. The second signal output unit 121 and the second signal input unit 122 may be connected to the control unit 100. For example, the second signal output unit 121 and the second signal input unit 122 may be provided to transmit electrical signals by terminals, conductors, cables, wires, or the like. One end of the second signal output unit 121 and one end of the second signal input unit 122 may be connected to the control unit 100. The other end of the second signal output unit 121 and the other end of the second signal input unit 122 may be exposed to the inner surface of the body 10. An extension portion connecting one end and the other end of the second signal output unit 121 and an extension portion connecting one end and the other end of the second signal input unit 122 may be disposed in the body 10. The second signal output unit 121 and the second signal input unit 122 may be spaced apart from each other. In the present embodiment, the level check unit 120 may be disposed below the bed check unit 110. The level check unit 120 may be disposed below the bed check unit 110 to install a second level check end 134 for checking the low level of the nutrient solution. In addition, the bed check unit 110 and the level check unit 120 may be disposed to be spaced apart from each other to minimize electrical interference.

The second signal output unit 121 may be defined as a transmission end for receiving an electrical signal from the control unit 100 and transmitting the electrical signal to the second signal input unit 122 or a signal output end for outputting an electrical signal. The second signal input unit 122 may be defined as a reception end for receiving an electrical signal from the second signal output unit 121 and transmitting the electrical signal to the control unit 100 or a signal input end for receiving an electrical signal. The control unit 100, the second signal output unit 121, and the second signal input unit 122 may be connected to a first level check end 132, a second level check end 134, and a second signal connection unit 133 which are described later. At this time, the first level check end 132 and the second level check end 134 may be energized with each other by the nutrient solution W stored in the cultivation bed 20. The first level check end 132 and the second level check end 134 may determine whether or not to energize according to the level of the nutrient solution W stored in the cultivation bed 20. In other words, the level check unit 120 can grasp the level of the nutrient solution W according to whether the first level check end 132 and the second level check end 134 are energized with each other by the nutrient solution W. An electrical signal transmitted from the second signal output unit 121 and the second signal input unit 122 may be defined as a second signal. The second signal may include information for grasping the level of nutrient solution stored in the cultivation bed 20.

The plant cultivating apparatus 1 may include a signal connection unit 130. The signal connection unit 130 may be provided to the cultivation bed 20. A portion of the signal connection unit 130 may be disposed in the cultivation bed 20. The remaining portion of the signal connection unit 130 may be exposed to the outer surface of the cultivation bed 20. The signal connection unit 130 may connect the first signal output unit 111 and the first signal input unit 112 or may connect the second signal output unit 121 and the second signal input unit 122.

The signal connection unit 130 may include a first signal connection unit 131. The first signal connection unit 131 may connect the first signal output unit 111 and the first signal input unit 112 of the bed check unit 110. In the present embodiment, the first signal connection unit 131 may be disposed on the rear surface of the cultivation bed 20. The rear surface of the cultivation bed 20 may be understood as one surface of the bed body facing the inner surface of the body 10 if the cultivation bed 20 is drawn into the body 10.

A portion of the first signal connection unit 131 may be disposed in the cultivation bed 20, and the remaining portion of the first signal connection unit 131 may be exposed in a direction toward the inner surface of the body 10. One end of the first signal connection unit 131 may be disposed at a position corresponding to the other end of the first signal output unit 111. One end of the first signal connection unit 131 may be exposed to the outer surface of the cultivation bed 20. One end of the first signal connection unit 131 may be exposed in a direction toward the inner surface of the body 10 to be in contact with the first signal output unit 111.

The other end of the first signal connection unit 131 may be disposed at a position corresponding to the other end of the first signal input unit 112. The other end of the first signal connection unit 131 may be exposed to the outer surface of the cultivation bed 20. The other end of the first signal connection unit 131 may be exposed in a direction toward the inner surface of the body 10 to be in contact with the first signal input unit 112.

An extension portion connecting one end and the other end of the first signal connection unit 131 may be disposed in the rear surface of the cultivation bed 20. Alternatively, an extension portion connecting one end and the other end of the first signal connection unit 131 may be disposed on an outer surface of the cultivation bed 20. In other words, the first signal output unit 111 and the first signal input unit 112 may be connected to each other by the first signal connection unit 131.

The control unit 100 can grasp whether the electrical signal transmitted by the first signal output unit 111, the first signal input unit 112, and the first signal connection unit 131 is transmitted and can grasp whether the cultivation bed 20 is drawn into or out. In the present embodiment, if an electrical signal is transmitted by the first signal output unit 111, the first signal input unit 112, and the first signal connection unit 131, the control unit 100 can recognize that the cultivation bed 20 is mounted at the exact position.

The signal connection unit 130 may include a plurality of level check ends 132 and 134. In the present embodiment, the level check ends 132 and 134 may include a first level check end 132 and a second level check end 134. The first level check end 132 and the second level check end 134 may be provided to the cultivation bed 20. The first level check end 132 and the second level check end 134 may be spaced apart from each other in the vertical direction. For example, the first level check end 132 may be disposed above the second level check end 134. The first level check end 132 may be disposed above the storage space in which the nutrient solution W is stored in the cultivation bed 20. The second level check end 134 may be disposed below the storage space in which the nutrient solution W is stored in the cultivation bed 20.

The first level check end 132 may be disposed on one side surface of the cultivation bed 20. The second level check end 134 may be disposed on the other side surface of the cultivation bed 20. A portion of the first level check end 132 may be exposed to the inner surface of the cultivation bed 20. A portion of the second level check end 134 may be exposed to the inner surface of the cultivation bed 20 and the outer surface of the cultivation bed 20. In detail, one end of the first level check end 132 and one end of the second level check end 134 may be exposed to the inner surface of the cultivation bed 20. In addition, the other end of the second level check end 134 may be exposed to the outer surface of the cultivation bed 20. The other end of the second level check end 134 may be disposed at a position corresponding to the second signal input unit 122. If the cultivation bed 20 is mounted in the body 10, the other end of the second level check end 134 and the other end of the second signal input unit 122 may be in contact with each other.

The remaining portion of the first level check end 132 may be disposed in one surface of the cultivation bed 20. The remaining portion of the second level check end 134 may be disposed in the rear surface of the cultivation bed 20. In detail, an extension portion extending from one end of the first level check end 132 may be disposed in one side surface of the cultivation bed 20. The extension portion extending from the first level check end 132 may be connected to the second signal connection unit 133 which will be described later. An extension portion connecting one end and the other end of the second level check end 134 may be disposed in the other side surface of the cultivation bed 20.

One end of the first level check end 132 and one end of the second level check end 134 may be in contact with the nutrient solution W according to the level of the nutrient solution W stored in the cultivation bed 20. In other words, the first level check end 132 and the second level check end 134 may be energized with each other by the nutrient solution W. For example, the electrical signal transmitted to the first level check end 132 may be transmitted to the second level check end 134 after passing through the nutrient solution W.

The control unit 100 can grasp whether the electrical signal transmitted by the first level check end 132, the second level check end 134, and the nutrient solution W is transmitted and can grasp the level of the nutrient solution W stored in the cultivation bed. The control unit can adjust a height at which the nutrient solution W is stored by adjusting a distance formed by the first level check end 132 and the second level check end 134 being spaced apart from each other. The height at which the nutrient solution W is stored may be a height at which the nutrient solution W may be in contact with the root of a plant sown in the cultivation bed 20.

In the present embodiment, the first level check end 132 can be disposed at a first height H1 which prevents the nutrient solution W from being excessively supplied and to which the nutrient solution W may be in contact with the root of the plant sown. The second level check end 134 may not be in contact with the nutrient solution to the root of the plant sown and may be disposed at a second height H2 adjacent to the bottom surface of the storage space in which the nutrient solution W is stored. The first height H1 and the second height H2 may be defined as heights spaced upwardly from a bottom of a storage space in which the nutrient solution W is stored. The first height H1 may be disposed to be higher than the second height H2. The second height H2 may be defined as a low level, and the first height H2 may be defined as a high level.

The signal connection unit 130 may include a second signal connection unit 133. The second signal connecting unit 133 may connect the first level check end 132 and the second signal output unit 121. One end of the second signal connection unit 133 may be exposed to the outer surface of the cultivation bed 20. One end of the second signal connection unit 133 may be disposed at a position corresponding to the second signal output unit 121. One end of the second signal connection unit 133 may be exposed in a direction toward the inner surface of the body 10. One end of the second signal connection unit 133 may be exposed in a direction toward the inner surface of the body 10 to be in contact with the second signal output unit 121. The other end of the second signal connection unit 133 may be connected to an extension portion extending from one end of the first level check end 132. An extension portion connecting one end and the other end of the second signal connection unit 133 may be disposed inside one or more of a bottom surface and a plurality of side surfaces of the cultivation bed 20. In the present embodiment, the second signal connection unit 133 may be disposed on one side surface of the cultivation bed 20 in which the first level check end 132 is disposed and in the bottom surface of the cultivation bed 20.

If the cultivation bed 20 is mounted in the body 10, the second signal output unit 121 may be connected to the first level check terminal 132 by the signal connection unit 130. In addition, the second signal input unit 122 may be connected to the second level check end 134.

The control unit 100 may grasp the level of the nutrient solution W stored in the cultivation bed 20 if the level check unit 120 and the signal connection unit 130 are connected to each other. The control unit 100 may adjust the amount of nutrient solution W supplied to the cultivation bed 20 through the pipe 45 according to the level of the nutrient solution W stored in the cultivation bed 20.

Meanwhile, the bed check unit 110 and the level check unit 120 may be disposed on at least one surface of the inner surface of the body 10 forming one surface of the cultivation chamber 11. In addition, the signal connection unit 130 may be disposed at a position corresponding to the bed check unit 110 and the level check unit 120. For example, if the bed check unit 110 and the level check unit 120 are provided on the side surface of the inner surface of the body 10, the signal connection unit 130 may be disposed on the side surface of a cultivation bed 20 corresponding to the side surface.

Figure 4:
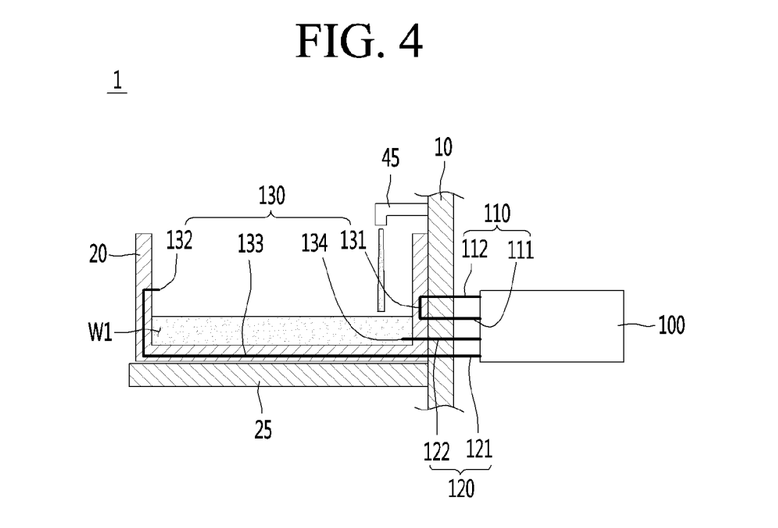
FIG. 4 is a view illustrating a state where the nutrient solution is supplied to the cultivation bed of the plant cultivating apparatus according to the present disclosure.
Figure 5:
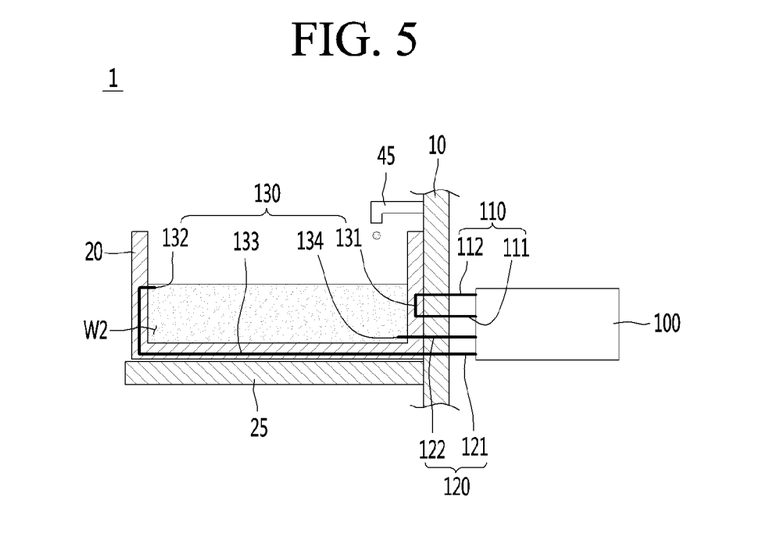
FIG. 5 is a view illustrating a state whether the nutrient solution supplied to the cultivation bed of the plant cultivating apparatus according to the present disclosure is blocked.

FIG. 4 is a view illustrating a state where the nutrient solution is supplied to the cultivation bed of the plant cultivating apparatus according to the present disclosure, and FIG. 5 is a view illustrating a state whether the nutrient solution supplied to the cultivation bed of the plant cultivating apparatus according to the present disclosure is blocked.

Referring to FIGS. 4 and 5, in a state where the cultivation bed 20 is drawn out of the body 10, the user may sow the plant or check the state of the plant. After sowing of the plant or managing the plant, the user may draw the cultivation bed 20 into the body 10. The cultivation bed 20 may be slidably moved in a state of being seated on the bed pedestal 25 to be drawn into the body 10.

If the cultivation bed 20 is drawn into the body 10, the bed check unit 110 may grasp whether the cultivation bed 20 is drawn into the exact position. In detail, if the cultivation bed 20 is drawn into the body 10, the rear surface of the cultivation bed 20 may be moved in a direction toward the inner surface of the body 10.

In the present embodiment, the bed check unit 110 may grasp whether the rear surface of the cultivation bed 20 is in contact with the inner surface of the body 10. If the cultivation bed 20 is in contact with the inner surface of the body 10, the first signal connection unit 131 disposed in the rear surface of the cultivation bed 20 may be connected to the first signal output unit 111 and the first signal input unit 112 of the bed check unit 110. If the first signal connection unit 131, the first signal output unit 111, and the first signal input unit 112 are connected, the control unit 100 can recognize that the cultivation bed 20 has reached the exact position in the body 10. If the cultivation bed 20 is correctly drawn into the body 10, the control unit 100 may check the level of the cultivation bed 20 using the level check unit 120.

The second signal output unit 121 and the second signal input unit 122 of the level check unit 120 may be connected to a first level check end 132, a second level check end 134, and the second signal connection unit 133 of the cultivation bed 20. The first level check end 132 and the second level check end 134 may be disposed to be spaced apart from each other in the vertical direction to grasp the level of the nutrient solution W stored in the cultivation bed 20. The control unit 100 may grasp whether the first level check end 132 and the second level check end 134 are immersed in the nutrient solution W stored in the cultivation bed 20 and grasp the level of the nutrient solution.

Referring to FIG. 4, the first nutrient solution W1 stored in the cultivation bed 20 may be in contact with the second level check end 134, but may not be in contact with the first level check end 132. The control unit 100 recognizes that the level of the first nutrient solution W1 stored in the cultivation bed 20 is insufficient, and operates the nutrient solution pump 44 to supply the nutrient solution.

Meanwhile, the cultivation bed 20 may be drawn out of the body 10 while the first nutrient solution W1 is supplied to the cultivation bed 20. If the cultivation bed 20 is drawn out to the outside of the body 10, the bed check unit 110 can be detected that the cultivation bed 20 is drawn out from the inner portion of the body 10 to the outer portion of the body 10. If it is detected that the cultivation bed 20 is drawn out from the body 10, the control unit 100 may stop the operation of the nutrient solution pump 44, so that the nutrient solution is not supplied.

Referring to FIG. 5, the second nutrient solution W2 stored in the cultivation bed 20 may be in contact with the first level check end 132 and the second level check end 134. If the first level check end 132 and the second level check end 134 are immersed in the second nutrient solution W2, the control unit 100 may recognize that the level of the second nutrient solution W2 stored in the cultivation bed 20 has reached the set height, and thus the operation of the nutrient solution pump 44 can be stopped not to supply the nutrient solution.

EXPLANATION OF REFERENCE NUMERAL

| | |
|---|---|
| 1: plant cultivating apparatus | 10: body |
| 11: cultivation chamber | 20: cultivation bed |
| 25: bed support unit | 30: light source module |
| 35: ventilation unit | 40: nutrient solution storage unit |

What is claimed is:

1. A plant cultivating apparatus comprising:
a body configured to have a cultivation chamber therein;
a cultivation bed configured to be disposed on an inner side of the cultivation chamber, to be provided to be movable relative to the body, and to have a storage space for storing nutrient solution therein;
a nutrient storage configured to store the nutrient solution supplied to the cultivation bed;
a pipe configured to supply the nutrient solution stored in the nutrient storage to the storage space of the cultivation bed;

a bed checker configured to be disposed on an inner surface of a body defining one surface of the cultivation chamber and to detect a movement of the cultivation bed;
a level checker configured to be disposed on an inner surface of a body defining one surface of the cultivation chamber and to detect a level of the nutrient solution received in the cultivation bed; and
a controller configured to receive a signal from the bed checker and the level checker, and to adjust whether the nutrient solution is supplied to the cultivation bed,
wherein the cultivation bed includes a signal connector that is disposed on a first surface of the cultivation bed corresponding to the bed checker and the level checker and that is selectively connected to the bed checker and the level checker according to whether the cultivation bed is moved in a rear and front direction,
wherein the signal connector includes:
a first signal connector that connects a first end and a second end of the bed checker and that is disposed at a rear portion of the cultivation bed,
a first level check end that is disposed at a first height of the storage space and that is disposed at a front portion of the cultivation bed,
a second level check end that is disposed at a second height of the storage space, that connects to a second end of the level checker, and that is disposed at the rear portion of the cultivation bed, and
a second signal connector that connects the first level check end and a first end of the level checker and that extends from the first level check end to the second level check end,
wherein the first level check end is disposed above the second level check end, and
wherein the controller is configured to, based on the nutrient solution stored in the storage space contacting the first level check end and the second level check end, block supply of the nutrient solution to the cultivation bed.

2. The plant cultivating apparatus of claim 1,
wherein the signal connector is connected to the bed checker and the level checker based on the cultivation bed being drawn into the body, and
wherein the signal connector is not connected to the bed checker and the level checker based on the cultivation bed being drawn out of the body.

3. The plant cultivating apparatus of claim 2,
wherein the signal connector is in contact with the bed checker and the level checker.

4. The plant cultivating apparatus of claim 2,
wherein the bed checker includes:
a first signal outputter which outputs a signal transmitted from the controller, and
a first signal inputter which receives a signal output from the first signal outputter.

5. The plant cultivating apparatus of claim 4,
wherein the first signal outputter and the first signal inputter are connected to the first signal connector and configured to transmit a signal.

6. The plant cultivating apparatus of claim 2,
wherein the level checker includes:
a second signal outputter which outputs a signal transmitted from the controller; and
a second signal inputter which receives a signal output from the second signal outputter.

7. The plant cultivating apparatus of claim 6,
wherein the first level check end and the second signal outputter are connected by the second signal connector, and
wherein the second level check end is connected to the second signal inputter.

8. The plant cultivating apparatus of claim 6,
wherein a signal output from the second signal outputter is transmitted to the second signal inputter based on the nutrient solution stored in the storage space reaching the first height, and
wherein a signal output from the second signal outputter is not transmitted to the second signal inputter based on the nutrient solution stored in the storage space being less the first height.

9. The plant cultivating apparatus of claim 8,
wherein the first level check end and the second level check end are energized with each other by the nutrient solution stored in the storage space.

10. The plant cultivating apparatus of claim 1,
wherein the level checker is disposed below the bed checker.

11. The plant cultivating apparatus of claim 1,
wherein the body includes:
a bed pedestal which supports the cultivation bed and is disposed below the cultivation bed.

12. The plant cultivating apparatus of claim 1,
wherein the level checker is configured to, based on the movement of the cultivation bed in the rear direction being detected in the bed checker, detect the level of the nutrient solution received in the cultivation bed, and
wherein the level checker is configured to, based on the movement of the cultivation bed in the front direction being detected by the bed checker, not detect the level of the nutrient solution received in the cultivation bed.

13. The plant cultivating apparatus of claim 12, further comprising:
a nutrient solution pump configured to suction the nutrient solution stored in the nutrient storage and discharge the nutrient solution to the pipe.

14. The plant cultivating apparatus of claim 13,
wherein the controller is configured to supply the nutrient solution by operating the nutrient solution pump based on (i) the movement of the cultivation bed in the rear direction being detected by the bed checker and (ii) the level of the cultivation bed not reaching a high level by the level checker.

15. The plant cultivating apparatus of claim 14, wherein the controller is configured to, based on the level of the cultivation bed reaching a high level by the level checker, stop operation of the nutrient solution pump.

16. The plant cultivating apparatus of claim 14, wherein the controller is configured to block the supply of the nutrient solution to the cultivation bed by stopping the operation of the nutrient solution pump.

17. The plant cultivating apparatus of claim 1, wherein the first level check end and the second level check end are opposite to each other with respect to the second signal connector.

* * * * *